United States Patent [19]
Wagner et al.

[11] Patent Number: 6,039,983
[45] Date of Patent: Mar. 21, 2000

[54] USE OF A PYRANOSE OXIDASE IN BAKING

[75] Inventors: Peter Wagner, Holte; Joan Qi Si, Laufen, both of Denmark

[73] Assignee: Novo Nordisk A/S, Bagsvaerd, Germany

[21] Appl. No.: 09/067,556

[22] Filed: Apr. 28, 1998

Related U.S. Application Data

[63] Continuation of application No. PCT/DK96/00550, Dec. 20, 1996.

[30] Foreign Application Priority Data

Dec. 20, 1995 [DK] Denmark ................................ 1447/95

[51] Int. Cl.[7] ........................................................ A21D 2/00
[52] U.S. Cl. .............................. 426/18; 426/19; 426/49; 426/52; 426/549
[58] Field of Search .................................. 426/18, 19, 21, 426/48, 49, 52, 20, 549

[56] References Cited

U.S. PATENT DOCUMENTS 4,617,190  10/1986  Montgomery ............................... 426/61

FOREIGN PATENT DOCUMENTS

| | | |
|---|---|---|
| 0 321 811 A1 | 6/1989 | European Pat. Off. . |
| 94/28728 | 12/1994 | WIPO . |
| 95/23515 | 9/1995 | WIPO . |
| 97/22257 | 6/1997 | WIPO . |

OTHER PUBLICATIONS

Ruelius et al., Biochim. Biophys. Acta, 167, pp. 493–500, (1968).

Hans W. Ruelius et al., "Carbohydrate Oxidase, A Novel Enzyme From Polyporus Obtusus", Biochim. Biophys. Acta, 167 (1968), pp. 493–500.

Huwig et al., Journal of Biotechnology, 32, pp. 309–315, (1994).

Huwig et al., Med. Fac. Landbouww. Univ. Gent, 57/4a, pp. 1749–1753, (1992).

Danneel et al., Eur. J. Biochem, 214, pp. 795–802, (1993).

Volc et al., Folia Microbiol., 30, pp. 141–147, (1985).

Volc et al., Archives of Microbiology, 156, pp. 297–301, (1991).

Kubatova et al., Enzyme Microb. Technol., vol. 13, pp. 755–759, Sep., (1991).

*Primary Examiner*—Leslie Wong
*Attorney, Agent, or Firm*—Steve T. Zelson; Valeta Gress

[57] ABSTRACT

A dough- or bread-improving composition containing a pyranose oxidase as well as the use of the composition in the preparation of dough and baked products.

12 Claims, 2 Drawing Sheets

USE OF A PYRANOSE OXIDASE IN BAKING

CROSS-REFERENCE TO RELATED APPLICATIONS

This application is a continuation of national application serial no. PCT/DK96/00550 filed on Dec. 20, 1996 and claims priority under 35 U.S.C. 119 of Danish application 1447/95 filed on Dec. 20, 1995.

FIELD OF THE INVENTION

The present invention relates to a bread-improving or dough-improving composition comprising an enzyme as well as to a method of preparing a dough and/or a baked product by use of the composition.

BACKGROUND OF THE INVENTION

In the bread-making process it is known to add bread-improving and/or dough-improving additives to the bread dough, the action of which, inter alia, results in improved texture, volume, flavour and freshness of the bread as well as improved machinability of the dough.

In recent years a number of enzymes have been used as dough and/or bread improving agents, in particular, enzymes which act on components present in large amounts in the dough. Examples of such enzymes are found within the groups of amylases, proteases, glucose oxidases and (hemi) cellulases, including pentosanases.

EP 321 811 and EP 338 452 disclose the use, in baking, of glucose oxidase in combination with other enzymes (sulfhydryl oxidase, hemicellulase, cellulase). Glucose oxidase catalyzes the oxidation of β-D-glucose to produce D-glucono-1,5-lactone and hydrogen peroxide.

Pyranose oxidases are enzymes which catalyse the oxidation of several monosaccharides at position C2 with the concomitant release of hydrogen peroxide. Glucose, in its pyranose form, tends to be the preferred substrate. However, a number of other substrates, e.g., furanoses such as xylose, can also be oxidised by the enzyme. The reaction product of glucose oxidation is 2-keto-glucose, and of xylose oxidation, 2-keto-xylose. The pyranose oxidase is distinct from glucose oxidase (E.C.1.1.34) which catalyses the oxidation of glucose at position C1 with the concomitant formation of gluconic acid.

Pyranose oxidases are of widespread occurrence, but in particular, in Basidiomycete fungi. Pyranose oxidases have been characterised or isolated, e.g., from the following sources: *Peniophora gigantea* (Huwig et al., 1994, Journal of Biotechnology 32, 309–315; Huwig et el., 1992, Med. Fac. Landbouww, Univ. Gent, 57/4a, 1749–1753; Danneel et al., 1993, Eur. J. Biochem. 214, 795–802), genera belonging to the Aphyllophorales (Volc et al., 198S, Folia Microbiol. 30, 141–147), *Phanerochaete chrysosporium* (Volc et al., 1991, Arch. Mirobiol. 156, 297–301, Volc and Eriksson, 1988, Methods Enzymol 161B, 316–322), *Polyporus pinsitus* (Ruelius et al., 1968, Biochim. Biophys. Acta, 167, 493–500) and *Bierkandera adusta* and *Phebiopsis gigantea* (Huwig et al., 1992, op. cit.)

The use, in baking, of a pyranose oxidase has never been suggested before.

It is the object of the present invention to improve the properties of dough and/or baked products by the use of a pyranose oxidase enzyme.

BRIEF DISCLOSURE OF THE INVENTION

Accordingly, in a first aspect the present invention relates to a bread-improving and/or a dough-improving composition comprising a pyranose oxidase enzyme.

In the present context the terms "bread-improving composition" and "dough-improving composition" are intended to indicate compositions which, in addition to the enzyme component, may comprise other substances conventionally used in baking to improve the properties of dough and/or baked products. Examples of such components are given below.

Without being limited to any theory, it is presently contemplated that when a pyranose oxidase enzyme is added to dough intended for use in the preparation of baked products, it may exert an oxidizing effect on dough constituents and thereby serve, e.g., to improve the strength of gluten structures in the dough and/or baked products and thereby improve the strength of the dough in addition to the rheological and the handling properties of the dough.

More specifically, the oxidizing effect is believed to be achieved when the enzyme catalyses oxidation of monosaccharides present in the flour or dough with the concomitant formation of hydrogen peroxide.

In the present context the term "improved properties" is intended to indicate any property which may be improved by the action of a pyranose oxidase enzyme. In addition to, or as a consequence of, the gluten strengthening effect mentioned above, the use of a pyranose oxidase may result in an increased volume and an improved crumb structure and softness of the baked product, as well as an increased strength, stability and reduced stickiness of the dough, thus resulting in improved machinability. The effect on the dough may be particularly advantageous when a poor quality flour is used. The improved machinability is of particular importance in connection with dough which is to be processed industrially.

The improved properties are evaluated by comparison with dough and/or baked products prepared without addition of a pyranose oxidase in accordance with the present invention.

In a second aspect, the present invention relates to a method of preparing a dough and/or a baked product prepared from the dough comprising adding a pyranose oxidase enzyme, optionally present in a bread-improving or dough-improving composition, to the dough and/or to any ingredient of the dough and/or to any mixture of the dough ingredients.

In further aspects, the present invention relates to a dough and a baked product, respectively, produced by the present method as well as to a pre-mix comprising a pyranose oxidase enzyme. In the present context, the term "pre-mix" is intended to be understood in its conventional meaning, i.e. as a mix of baking agents, normally including flour, which may be used not only in industrial bread-baking plants/facilities, but also in retail bakeries.

In a final aspect, the present invention relates to the use of a pyranose oxidase enzyme for the preparation of dough and/or baked products.

DETAILED DISCLOSURE OF THE INVENTION

As mentioned in the Background of the Invention section above pyranose oxidases have been found to be of widespread occurrence, in particular among Basidiomycete fungi. It is contemplated that the origin of the pyranose oxidase to be used in the present invention is not critical with a view to exerting its dough and/or baked product improving capability. Accordingly, the pyranose oxidase enzyme of the dough- and/or bread-improving composition of the invention may be of any origin.

The pyranose oxidase may be derived, e.g., from a microbial source, such as a fungus, e.g., a filamentous fungus or a yeast, in particular a Basidomycete fungus. The pyranose oxidase may be derived from genera belonging to Agaricales, such as Oudemansiella or Mycena, to Aphyllophorales, such as Trametes, e.g. *T. hirsuta, T. versicolor T. gibbosa, T. suaveolens, T. ochracea, T. pubescens*, or to Phanerochaete, Lenzites or Peniophora, and may be any of the specific pyranose oxidases described in the references cited in the Background of the Invention section above.

The pyranose oxidase may be obtained from the organism in question by use of any suitable technique. For instance, a pyranose oxidase preparation may be obtained by use of recombinant DNA techniques as known in the art. Such method normally comprises cultivation of a host cell transformed with a recombinant DNA vector capable of expressing and carrying a DNA sequence encoding the pyranose oxidase in question, in ai culture medium under conditions permitting the expression of the enzyme and recovering the enzyme from the culture. The DNA sequence may be of genomic, cDNA or synthetic origin, or any mixture of these, and may be isolated or synthesized in accordance with methods known in the art. The pyranose enzyme may also be extracted from the organism, or relevant part thereof, by which it is produced in nature.

The pyranose oxidase enzyme to be included in the bread-improving and/or dough-improving composition of the invention may be in any form suited for the use in question, e.g. in the form of a dry powder or granulate, in particular a non-dusting granulate, a liquid, in particular a stabilized liquid, or a protected enzyme. Granulates may be produced as disclosed, e.g., in U.S. Pat. No. 4,106,991 and U.S. Pat. No. 4,661,452 (both to Novo Industri A/S), and may be optionally coated by methods known in the art. Liquid enzyme preparations may, for instance, be stabilized by adding nutritionally acceptable stabilizers such as a sugar, a sugar alcohol or another polyol, lactic acid or another organic acid according to established methods. Protected enzymes may be prepared according to the method disclosed in EP 238,216.

Normally, for inclusion in pre-mixes or flour it is advantageous that the pyranose oxidase enzyme preparation is in the form of a dry product, e.g. a non-dusting granulate, whereas for inclusion together with a liquid it is advantageously in a liquid form.

The bread- and/or dough-improving composition of the invention may further comprise one or more other enzymes. Examples of other enzymes are a cellulase, a hemicellulase, e.g., a pentosanase or xylanase (useful for the partial hydrolysis of pentosans which increases the extensibility of the dough), a lipase (useful for the modification of lipids present in the dough or dough constituents so as to soften the dough), another oxidase, e.g. a glucose oxidase, a peroxidase (useful for improving the dough consistency), a protease (useful for gluten weakening, in particular when using hard wheat flour), a peptidase and/or an amylase, e.g., an α-amylase (useful for providing sugars fermentable by yeast).

The other enzyme components are preferably of microbial origin and may be obtained by conventional techniques used in the art as mentioned above.

The dough-improving and/or bread-improving composition may also comprise an added substrate for the pyranose enzyme in question generated by an exo-enzyme, optionally in combination with an endo-enzyme that will enhance the effect of the former. Examples of such exo-enzymes and endo-enzymes include: α-amylase, β-amylase, maltogenase, as well as the combinations of b-xylosidase+endo-xylanase and galactosidase+galactanase.

By use of one or more of the above-mentioned exo- and/or endo-enzymes, more substrate becomes available for the pyranose oxidase of interest, thereby prolonging the activity of the enzyme.

The specific amounts of the various carbohydrate substrates available for the pyranose oxidase will depend on a number of factors, such as the baking process used, the length of time for mixing, fermentation, proofing and/or baking, the quality of the yeast and/or flour used, as well as the activity of endogenous and exogenous enzymes present.

Of particular interest is maltose, which has been shown to be a substrate for a pyranose oxidase (Danneel, H -J, et al, 1993, supra). Because the levels of maltose normally produced throughout the fermentation process are high, the activity of pyranose oxidase on this substrate can increase the amount of hydrogen peroxide generated and/or extend the period of hydrogen peroxide production during the baking process. By comparison, significant reactivity to maltose as a substrate has not been reported for another oxidase, such as glucose oxidase.

Pyranose oxidase has also been reported to show significant activity towards D-glucono-1,5-lactone (cf, Olsson and Mandenius, 1991. Enzyme Microb. Technol. 13 755–759; Ruelius et al., 1968, supra) which is produced by the oxidation of glucose by glucose oxidase. It therefore follows that when pyranose oxidase is combined with a glucose oxidase, there, is more substrate available for the former, thereby prolonging the activity of the pyranose oxidase and enhancing the total amount of hydrogen peroxide generated.

Commercially available enzymes which may enhance the activity of the pyranose enzyme in this manner include Novamyl®, a maltogenic α-amylase commercially available from Novo Nordisk A/S; the antistaling agents Stalingase™ available from Gist-brocades N.V.; Grindamyl MaxLife™ and other products of the product line Grindamyl™ from Grindsted Products A/S; enzyme products of the product line Veron™ from Röhm GmbH; β-amylases from plants, such as soy bean, wheat, and barley, commercially available as Nagase and Speezyme from Genencor Inc.

In addition, or as an alternative, to other enzyme components, the dough-improving and/or bread-improving composition may comprise a conventionally used baking agent, e.g. one or more of the following constituents:

A milk powder (providing crust colour), gluten (to improve the gas retention power of weak flours), an emulsifier (to improve dough extensibility and to some extent the consistency of the resulting bread), granulated fat (for dough softening and consistency of bread), an oxidant (added to strengthen the gluten structure; e.g. ascorbic acid, potassium bromate, potassium iodate or ammonium persulfate), an amino acid (e.g. cysteine), a sugar, and salt (e.g. sodium chloride, calcium acetate, sodium sulfate or calcium sulphate serving to make the dough firmer), flour or starch.

Examples of suitable emulsifiers are mono- or diglycerides, diacetyl tartaric acid esters of mono- or diglycerides, sugar esters of fatty acids, polyglycerol esters of fatty acids, lactic acid esters of monoglycerides, acetic acid esters of monoglycerides, polyoxyethylene stearates, phospholipids and lecithin.

The bread-improving and/or dough improving composition of the invention is typically included in the dough in an amount corresponding to 0.01–5%, in particular 0.1–3%.

In accordance with the method of the invention, in which a pyranose oxidase is used for the preparation of dough and/or baked products, the enzyme may be added as such to a mixture of ingredients from which the dough is to be made. Alternatively, the pyranose oxidase enzyme may be added as a constituent of a dough-improving and/or a bread-improving composition as described above.

The pyranose oxidase must be used in an amount sufficient to provide the desired effect; i.e., the improved properties in question. Thus, the dosage of the enzyme to be used in the method of the present invention should be adapted to the nature and composition of the dough in question as well as to the nature of the pyranose oxidase enzyme to be used. Normally, the enzyme preparation is added in an amount corresponding to 0.01–1000 mg enzyme protein per kg of flour, preferably 0.1–100 mg enzyme protein per kg of flour, more preferably 0.1–10 mg enzyme protein per kg of flour, and most preferably 1–5 mg enzyme protein per kg of flour.

In terms of enzyme activity, the appropriate dosage of a given pyranose oxidase enzyme for exerting a desirable improvement of dough and/or baked products will depend on the enzyme and the enzyme substrate in question. The skilled person may determine a suitable enzyme unity dosage on the basis of methods known in the art.

When one or more additional enzyme activities are to be added in accordance with the method of the invention, these activities may be added separately or together with the pyranose oxidase preparation, optionally as constituent(s) of the bread-improving and/or dough-improving composition of the invention. The other enzyme activities may be any of the above described enzymes and may be dosed in accordance with established balking practice.

Analogously, when a substrate for the pyranose enzyme is to be added in accordance with the method of the invention, the substrate may be added separately or together with the pyranose oxidase preparation, optionally as constituent(s) of the bread-improving and/or dough-improving composition of the invention.

As mentioned above, the pyranose oxidase enzyme is added to any mixture of dough ingredients, to the dough, or to any of the ingredients to be included in the dough. In other words, the pyranose oxidase enzyme may be added in any step of the dough preparation and may be added in one, two or more steps, where appropriate.

The handling of the dough and/or baking is performed in any suitable manner for the dough and/or baked product in question, typically including the steps of kneading the dough, subjecting the dough to one or more proofing treatments, and baking the product under suitable conditions, i.e. at a suitable temperature and for a sufficient period of time. For instance, the dough may be prepared by using a normal straight dough process, a sour dough process, an overnight dough method, a low-temperature and long-time fermentation method, a frozen dough method, the Chorleywood Bread process, or the Sponge and Dough process.

The dough and/or baked product prepared by the method of the invention are normally based on wheat meal or flour, optionally in combination with other types of meal or flour such as corn flour, rye meal, rye flour, oat flour or meal, soy flour, sorghum meal or flour, or potato meal or flour.

In the present context the term "baked product" is intended to include any product prepared from dough, either of a soft or a crisp character. Examples of baked products, whether of a white, light or dark type, which may advantageously be produced by the present invention are bread (in particular white, whole-meal or rye bread), typically in the form of loaves or rolls, French baguette-type bread, pita bread, tacos, cakes, pan-cakes, biscuits, crisp bread and the like.

The dough of the invention may be of any of the types discussed above, and may be fresh or frozen.

From the above disclosure it will be apparent that the dough of the invention is normally a leavened dough or a dough to be subjected to leavening. The dough may be leavened in various ways such as by adding sodium bicarbonate or the like, or by adding a leaven (fermenting dough), but it is preferable that the dough be leavened by adding a suitable yeast culture, such as a culture of *Saccharomyces cerevisiae* (baker's yeast). Any of the commercially available *S. cereviciae* strains may be employed.

As mentioned above, the present invention further relates to a pre-mix, e.g., in the form of a flour composition, for dough and or baked products made from dough, in which the pre-mix comprises a pyranose oxidase enzyme. The pre-mix may be prepared by mixing a pyranose oxidase preparation or a bread-improving and/or dough-improving composition of the invention comprising a pyranose oxidase with a suitable carrier such as flour, starch, a sugar or a salt. The pre-mix may contain other dough-improving and/or bread-improving additives, e.g., any of the additives, including enzymes, mentioned above.

In a further aspect the invention relates to the use of a pyranose enzyme for improving properties of a dough and/or a baked product made therefrom. The type of pyranose oxidase as well as the manner in which it may be used is described in detail above.

In a final aspect, the invention relates to the use of a pyranose oxidase for the preparation of pasta dough, preferably prepared from durum flour or a flour of comparable quality. The dough may be prepared by use of conventional techniques and the pyranose oxidase used in a similar dosage as that described above. The pyranose oxidase may be any of the types described above. It is contemplated that when used in the preparation of pasta, the pyranose oxidase results in a strengthening of the gluten structure, a reduction in the dough stickiness and an increased dough strength.

BRIEF DESCRIPTION OF DRAWINGS

The present invention is further illustrated by reference to the accompanying drawings, in which.

MATERIALS AND METHODS

Determination of pyranose oxidase activity

Figure 1:
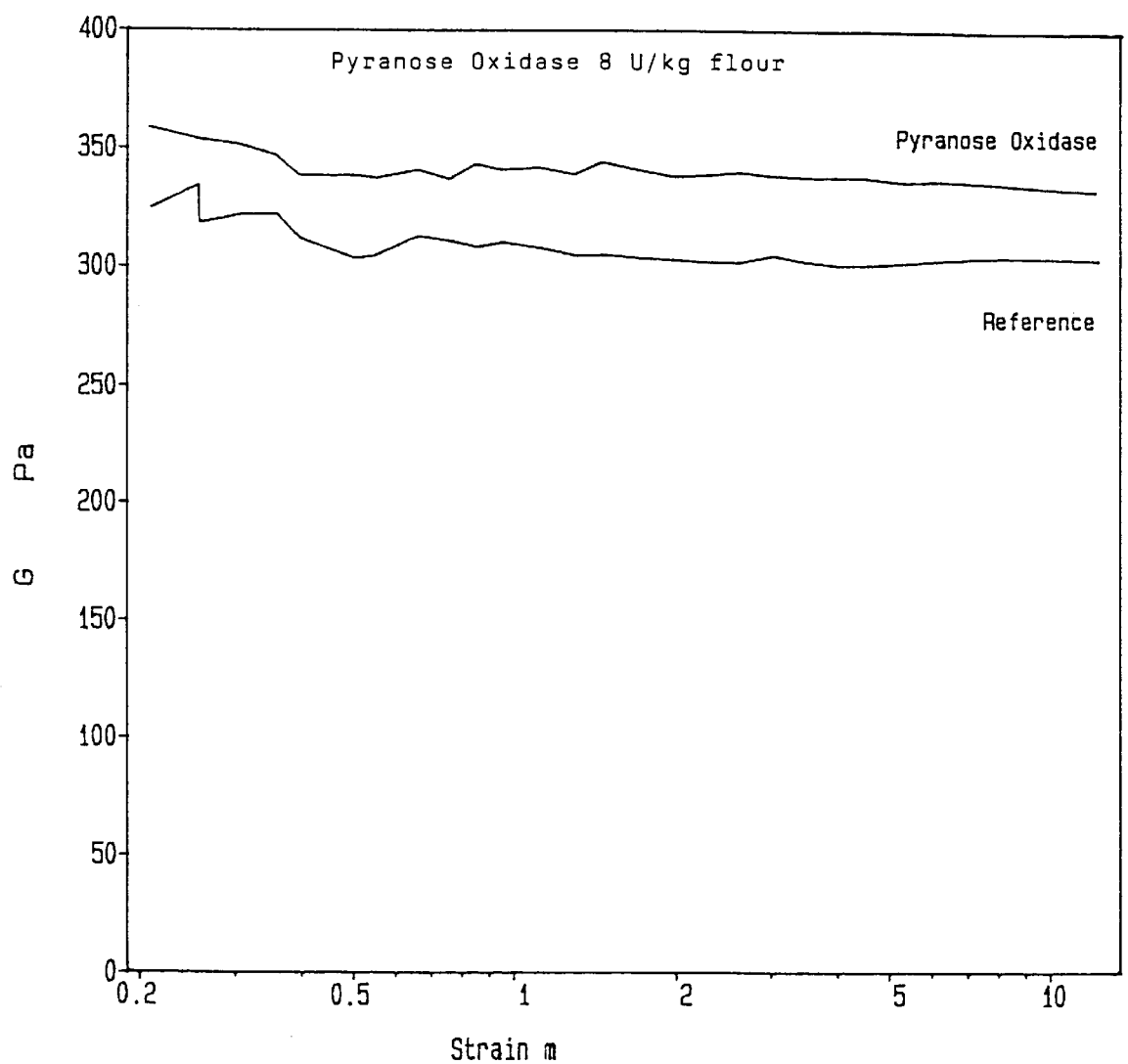
FIG. 1 shows the dynamic shear storage modulus G' in gluten from a dough containing pyranose oxidase and a reference dough which does not contain the enzyme.

Pyranose oxidase activity is measured using the following calorimetric assay. Pyranose oxidase oxidizes D-glucose to D-arabino-2-hexosulose (2-keto-D-glucose, D-glucosone) in the presence of oxygen, resulting in hydrogen peroxide. The hydrogen peroxide formed, in the presence of peroxidase, oxidizes ABTS (2,2'-azinobis(3-ethylbenzothiazoline-6-sulfonate)). The greenish-blue colour resulting after a fixed reaction time measured as the absorbance at 418 nm is a function of the amount of hydrogen peroxide.

180 microliter of the substrate, 50 mM glucose in 50 mM phosphate buffer, pH 6.0, and 0.05% Tween 20, are added to 20 microliter of diluted enzyme. The reaction mixture is incubated for 20 min at 30° C. 100 microliter of this reaction mixture is removed and added to 100 microliter of 0.65 mM ABTS (2,2'-azinobis[benzothiazoline-6-sulfonate] in 0.2 M phosphate buffer, pH 7.0, to which an excess of peroxidase is added. After 1 min the absorbance is measured at 650 nm. The activity within the linear range is calculated from a standard curve derived from dilutions of $H_2O_2$. The activity of the pyranose oxidase is expressed in UNITS (U), where 1 U is the amount of pyranose oxidase which forms 1 $\mu$mole of hydrogen peroxide per minute under the above standard conditions.

Instead of glucose, other monosaccharide substrates may be used, e.g. a pyranose such as xylose.

Testing of Doughs and Breads

According to the present invention the effect of adding a pyranose oxidase may be tested in doughs and breads by using the following method:

| Recipe: | |
|---|---|
| Water | 60% |
| Wheat Flour | 100% |
| Yeast | 4% |
| Salt | 1.5% |
| Sugar | 1.5% |

The wheat flour was of the type Meneba 964.

Preparation of Breads

Procedure:
1. Dough mixing (Spiral mixer)
   3 min. at 700 RPM
   8 min. at 1400 RPM
   the mixing time is determined and adjusted by a skilled baker so as to obtain an optimum dough consistence under the testing conditions used.
2. 1st proof: 30° C.—80% RH, 20 min.
3. Scaling and shaping;
4. Final proof: 32° C.—80% RH, 40 min.;
5. Baking: 225° C., 20 min. for rolls and 30 min for loaf.

Evaluation of Dough and Baked Products

Dough and baked products may be evaluated as follows: Loaf specific volume: the mean value of 4 loaves volume are measured using the traditional rape seed method. The specific volume is calculated as volume ml per g bread. The specific volume of the control (without enzyme) is defined as 100. The relative specific volume index is calculated as:

$$\text{Specific vol. index} = \frac{\text{specific vol. of 4 loaves}}{\text{spec. vol. of 4 control loaves}} * 100$$

The dough stickiness and crumb structure may be evaluated visually according to the following scale:

| Dough stickiness: | almost liquid | 1 |
|---|---|---|
| | too sticky | 2 |
| | sticky | 3 |
| | normal | 4 |
| | dry | 5 |
| Crumb structure: | very poor | 1 |
| | poor | 2 |
| | non-uniform | 3 |
| | uniform/good | 4 |
| | very good | 5 |

Shock test: After the second proof a pan containing the dough is dropped from a height of 20 cm. The dough is baked and the volume of the resulting bread is determined.

Gluten Strengthening

The strengthening effect of a given dough conditioner on wheat flour dough or gluten dough may be measured by dynamic rheological measurements. These measurements are able to show the strength of a dough under oscillation. Both wheat fluor dough and gluten dough are viscoelastic materials. In oscillatory measurements, the viscoelastic properties of a wheat dough and a gluten dough can be divided into two components, the dynamic shear storage modulus G' and the dynamic shear loss modulus G". The ratio of the loss and the storage moduli is numerically equal to the tangent of the viscoelastic phase angle δ_(Delta). An increase in the storage modulus G' and a decrease in the phase angle δ indicate a stronger and more elastic dough.

The dynamic shear storage modulus G' and the viscoelastic phase angle δ were measured using the Bohlin rheometer system. Gluten from a dough treated with pyranose oxidase obtained from *Trametes hirsuta* at a dose of 8 U/kg flour was compared with a reference dough which had not treated with the enzyme. The enzyme was added to the flour before dough mixing. The gluten was washed out of the flour dough containing the conditioner after the flour dough had been incubated at 32° C. for 1½ hours. The results of the tests are presented in FIGS. 1 and 2.

As shown in FIG. 1, it was surprisingly found that the storage modulus, G', is significantly higher in the dough containing pyranose oxidase than in the reference dough. This effect indicates that the gluten, and hence the dough, is significantly strengthened by the action of the enzyme.

Figure 2:
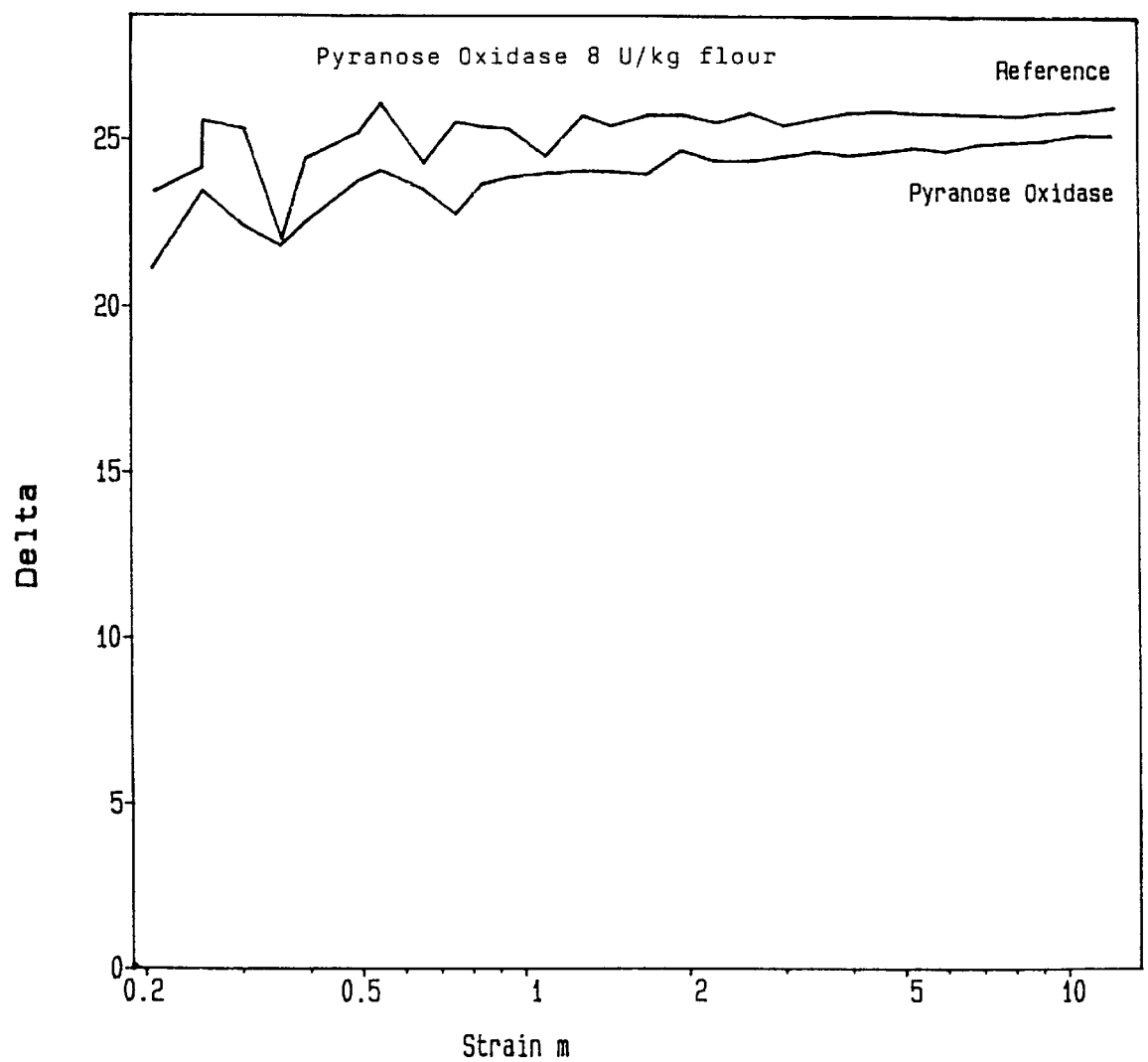
FIG. 2 shows the viscoelastic phase angle Delta in gluten from 2 doughs defined as for FIG. 1.

FIG. 2 shows that the viscoelastic phase angle, Delta, is lowered when pyranose oxidase is present in the dough relative to the reference dough, indicating that a more elastic rheological property of the gluten, and hence the dough, is achieved by the action of the enzyme.

We claim:

1. A method of preparing a dough or a baked product prepared from the dough, comprising adding a pyranose oxidase enzyme to the dough ingredient or any mixture of the dough ingredients.

2. The method of claim 1, wherein the pyranose oxidase enzyme is added in an amount corresponding 0.01–1000 mg enzyme protein per kg of flour.

3. The method of claim 1, further comprising adding another enzyme, or another bread-improving or dough improving agent is added to the dough ingredient or any mixture of dough ingredients.

4. A dough or bread product produced by the method of claim 1.

5. The method of claim 3, wherein one or more of α-amylase, β-amylase, maltogenase, b-xylosidase, endo-xylanase, galactosidase, and galactanase is added.

6. A bread-improving or a dough-improving composition comprising a pyranose oxidase enzyme and a second enzyme, wherein the second enzyme is one of α-amylase, β-amylase, maltogenase, b-xylosidase, endo-xylanase, galactosidase, galactanase, cellulase, hemicellulase, pentosanase, lipase, peroxidase, protease, oxidase, and peptidase.

7. The bread-improving or dough-improving composition of claim 6, wherein the pyranose oxidase is of microbial origin.

8. The bread-improving or dough-improving composition of claim 7, wherein the pyranose oxidase is of fungal origin.

9. The bread-improving or dough-improving composition of claim 8, wherein the pyranose oxidase is derived from a genus belonging to Aphyllophorales.

10. A pre-mix for dough comprising the composition of claim 6.

11. The bread-improving or dough-improving composition of claim 8, wherein the pyranose oxidase is obtained from the fungus Basidomycete.

12. The bread-improving or dough-improving composition of claim 9, wherein the pyranose oxidase is derived from Trametes.

* * * * *